United States Patent
Guerrero

(10) Patent No.: US 7,318,374 B2
(45) Date of Patent: Jan. 15, 2008

(54) WIRE CLOTH COFFEE FILTERING SYSTEMS

(76) Inventor: Victor Guerrero, 2139 Lincoln Way, San Francisco, CA (US) 94122

( * ) Notice: Subject to any disclaimer, the term of this patent is extended or adjusted under 35 U.S.C. 154(b) by 322 days.

(21) Appl. No.: 10/762,831

(22) Filed: Jan. 21, 2004

(65) Prior Publication Data

US 2004/0182247 A1 Sep. 23, 2004

Related U.S. Application Data

(60) Provisional application No. 60/533,240, filed on Dec. 31, 2003, provisional application No. 60/493,572, filed on Aug. 11, 2003, provisional application No. 60/476,106, filed on Jun. 6, 2003, provisional application No. 60/468,035, filed on May 6, 2003, provisional application No. 60/441,217, filed on Jan. 21, 2003.

(51) Int. Cl.
*A47J 31/00* (2006.01)
*A47G 19/22* (2006.01)

(52) U.S. Cl. .............................. 99/322; 99/321; 99/323

(58) Field of Classification Search .................. 99/321, 99/322, 323, 317, 306, 320, 299, 315, 287; 220/713, 521, 501, 371, 372
See application file for complete search history.

(56) References Cited

U.S. PATENT DOCUMENTS

| | | | |
|---|---|---|---|
| 642,798 A * | 2/1900 | MacDonald | 99/322 |
| 741,547 A * | 10/1903 | Renner | 99/320 |
| 2,133,166 A * | 10/1938 | Fritsche | 99/323 |
| 3,960,652 A | 6/1976 | Conway et al. | |
| 4,031,039 A | 6/1977 | Mizumoto et al. | |
| 4,059,609 A | 11/1977 | Rinehart | |
| 4,059,652 A | 11/1977 | Allan et al. | |
| 4,101,627 A | 7/1978 | Menier | |
| 4,103,602 A | 8/1978 | Oggioni et al. | |
| 4,158,329 A | 6/1979 | McKnight | |
| 4,207,809 A | 6/1980 | Brill | |
| 4,221,670 A * | 9/1980 | Ziemek | 210/474 |
| 4,243,876 A | 1/1981 | Engel et al. | |
| 4,253,825 A | 3/1981 | Fasano | |
| 4,298,167 A | 11/1981 | Stahl et al. | |
| 4,323,160 A | 4/1982 | Cowgill | |
| 4,331,696 A | 5/1982 | Bruce, III | |
| 4,338,181 A | 7/1982 | Solomon | |
| 4,354,917 A | 10/1982 | Solomon | |
| 4,354,958 A | 10/1982 | Solomon | |
| 4,357,262 A | 11/1982 | Solomon | |
| 4,364,805 A | 12/1982 | Rogers | |
| 4,364,806 A | 12/1982 | Rogers | |
| 4,364,979 A | 12/1982 | Dutton | |
| 4,370,284 A | 1/1983 | Solomon | |
| 4,370,473 A | 1/1983 | Marev et al. | |
| 4,379,034 A | 4/1983 | Rogers | |
| 4,382,875 A | 5/1983 | Solomon | |
| 4,397,676 A | 8/1983 | Bakel | |
| 4,409,045 A | 10/1983 | Busse | |

(Continued)

OTHER PUBLICATIONS

Zak Product on Website http://www.zak.com/com.

*Primary Examiner*—Reginald L. Alexander
(74) *Attorney, Agent, or Firm*—Gordon & Rees, LLP

(57) ABSTRACT

A beverage filter assembly, including a frame having a plurality of openings passing therethrough; and a wire cloth filter disposed within the frame.

11 Claims, 13 Drawing Sheets

U.S. PATENT DOCUMENTS

| | | |
|---|---|---|
| 4,422,918 A | 12/1983 | Inoue |
| 4,429,623 A | 2/1984 | Illy |
| 4,440,617 A | 4/1984 | Solomon |
| 4,456,521 A | 6/1984 | Solomon et al. |
| 4,459,197 A | 7/1984 | Solomon |
| 4,465,649 A | 8/1984 | Johnson |
| 4,468,362 A | 8/1984 | Solomon |
| 4,473,003 A | 9/1984 | Stone, Jr. |
| 4,490,335 A | 12/1984 | Marev et al. |
| 4,500,019 A | 2/1985 | Curley, Jr. |
| 4,510,019 A | 4/1985 | Bartelloni |
| 4,518,705 A | 5/1985 | Solomon et al. |
| 4,520,950 A | 6/1985 | Jeans |
| 4,542,176 A | 9/1985 | Graham |
| 4,550,027 A | 10/1985 | Stone, Jr. |
| 4,582,666 A | 4/1986 | Kenworthy et al. |
| 4,591,508 A | 5/1986 | Pultinas, Jr. |
| 4,624,177 A | 11/1986 | Ito et al. |
| 4,629,589 A | 12/1986 | Gupta |
| 4,630,975 A | 12/1986 | Becker |
| 4,640,839 A | 2/1987 | Hsu |
| 4,650,583 A | 3/1987 | Bondanini |
| 4,666,390 A | 5/1987 | Kenworthy et al. |
| 4,667,584 A | 5/1987 | Koyama et al. |
| 4,667,654 A | 5/1987 | Thaler et al. |
| 4,680,185 A * | 7/1987 | Illk .............. 426/83 |
| 4,683,666 A | 8/1987 | Igusa et al. |
| 4,702,799 A | 10/1987 | Tuot |
| 4,721,035 A | 1/1988 | Chang-Diaz |
| 4,721,395 A | 1/1988 | Olsson et al. |
| 4,724,620 A | 2/1988 | Hsu |
| 4,728,425 A * | 3/1988 | Sandvig ............ 210/477 |
| 4,735,935 A | 4/1988 | McAnalley |
| 4,762,764 A | 8/1988 | Ng et al. |
| 4,779,519 A | 10/1988 | Giuliano |
| 4,809,594 A | 3/1989 | Vitous |
| 4,830,645 A | 5/1989 | Ghodsizadeh et al. |
| 4,832,951 A | 5/1989 | Chang-Diaz |
| 4,851,224 A | 7/1989 | McAnalley |
| 4,859,248 A | 8/1989 | Thaler et al. |
| 4,867,880 A | 9/1989 | Pelle et al. |
| 4,877,694 A | 10/1989 | Solomon et al. |
| 4,917,890 A | 4/1990 | McAnalley |
| 4,928,584 A | 5/1990 | Young |
| 4,957,907 A | 9/1990 | McAnalley |
| 4,959,214 A | 9/1990 | McAnalley |
| 4,966,892 A | 10/1990 | McAnalley |
| 4,980,215 A | 12/1990 | Schonbrun |
| 4,986,172 A * | 1/1991 | Hunnicutt, Jr. .............. 99/306 |
| 5,015,394 A | 5/1991 | McEllhenney et al. |
| 5,030,473 A | 7/1991 | Ghodsizadeh |
| 5,068,979 A | 12/1991 | Wireman et al. |
| 5,085,847 A | 2/1992 | Shaffer et al. |
| 5,099,861 A | 3/1992 | Clearman et al. |
| 5,112,638 A | 5/1992 | Cagley et al. |
| 5,121,855 A | 6/1992 | Credle, Jr. |
| 5,135,744 A | 8/1992 | Alexander et al. |
| 5,137,744 A | 8/1992 | Cagley et al. |
| 5,149,398 A | 9/1992 | Shaffer et al. |
| 5,154,111 A | 10/1992 | Luciano |
| 5,155,923 A | 10/1992 | Wireman et al. |
| 5,159,764 A | 11/1992 | Wireman et al. |
| 5,176,830 A | 1/1993 | Wiggins |
| 5,182,926 A | 2/1993 | Carns et al. |
| 5,190,653 A | 3/1993 | Herrick et al. |
| 5,195,422 A | 3/1993 | Newman |
| 5,207,993 A | 5/1993 | Burris |
| 5,214,998 A | 6/1993 | Konoeda |
| 5,222,364 A | 6/1993 | Carns et al. |
| 5,230,278 A | 7/1993 | Bunn et al. |
| 5,230,281 A | 7/1993 | Wireman et al. |
| 5,252,136 A | 10/1993 | Desforges et al. |
| 5,253,578 A | 10/1993 | Hsu |
| 5,255,593 A | 10/1993 | Bunn et al. |
| 5,258,197 A | 11/1993 | Wheeler et al. |
| 5,265,518 A | 11/1993 | Reese et al. |
| 5,265,520 A | 11/1993 | Giuliano |
| 5,277,810 A | 1/1994 | Shepard |
| 5,284,170 A | 2/1994 | Larsen |
| 5,287,591 A | 2/1994 | Rench et al. |
| 5,292,005 A | 3/1994 | Wireman et al. |
| 5,297,992 A | 3/1994 | Bailey et al. |
| 5,300,746 A | 4/1994 | Walters et al. |
| 5,303,639 A | 4/1994 | Bunn et al. |
| 5,305,924 A | 4/1994 | Groover et al. |
| 5,307,538 A | 5/1994 | Rench et al. |
| 5,309,820 A | 5/1994 | Baxter et al. |
| 5,323,623 A | 6/1994 | Carns et al. |
| 5,352,888 A | 10/1994 | Childress |
| 5,360,620 A | 11/1994 | Hsu |
| 5,363,535 A | 11/1994 | Rench |
| 5,364,508 A | 11/1994 | Weres et al. |
| 5,372,832 A | 12/1994 | Bunn et al. |
| 5,378,490 A | 1/1995 | Wheeler et al. |
| 5,393,540 A | 2/1995 | Bunn et al. |
| 5,399,370 A | 3/1995 | Hsu |
| 5,411,255 A | 5/1995 | Kurashima et al. |
| 5,417,255 A | 5/1995 | Sanfilippo et al. |
| 5,456,893 A | 10/1995 | Silver |
| 5,456,939 A | 10/1995 | Wheeler et al. |
| 5,471,917 A | 12/1995 | Hsu |
| 5,544,566 A | 8/1996 | Bersten |
| 5,552,174 A | 9/1996 | Wheeler et al. |
| 5,559,673 A | 9/1996 | Gagnon et al. |
| 5,565,232 A | 10/1996 | Wheeler et al. |
| 5,589,216 A | 12/1996 | Guskey et al. |
| 5,617,705 A | 4/1997 | Sanfilippo et al. |
| 5,628,902 A * | 5/1997 | Pytlik et al. ................ 210/474 |
| 5,635,233 A | 6/1997 | Levinson |
| 5,638,741 A | 6/1997 | Cisaria |
| 5,662,953 A | 9/1997 | Wheeler et al. |
| 5,678,472 A | 10/1997 | Millman |
| 5,698,101 A | 12/1997 | Kopp et al. |
| 5,700,464 A | 12/1997 | Silver |
| 5,782,698 A | 7/1998 | Keller |
| 5,813,318 A | 9/1998 | Zanin et al. |
| 5,863,301 A | 1/1999 | Grosso et al. |
| 5,874,263 A | 2/1999 | Holtzapple et al. |
| 5,891,433 A | 4/1999 | Silver |
| 5,913,963 A | 6/1999 | King |
| 5,916,110 A | 6/1999 | Sanfilippo et al. |
| 5,927,179 A | 7/1999 | Mordini et al. |
| 5,943,790 A | 8/1999 | Gell, Jr. |
| 5,958,497 A | 9/1999 | Grimm et al. |
| 5,961,000 A | 10/1999 | Sanfilippo et al. |
| 5,962,307 A | 10/1999 | Holtzapple et al. |
| 5,970,850 A | 10/1999 | Piazza |
| 5,974,899 A | 11/1999 | Hanks |
| 5,989,696 A | 11/1999 | McCarthy et al. |
| 6,015,913 A | 1/2000 | Kealey et al. |
| 6,032,438 A | 3/2000 | Sanfilippo et al. |
| 6,063,402 A | 5/2000 | Gebert et al. |
| 6,079,314 A | 6/2000 | Mackinnon |
| 6,079,315 A | 6/2000 | Beaulieu et al. |
| 6,079,317 A | 6/2000 | Fukushima |
| 6,079,626 A | 6/2000 | Hartman |
| 6,090,349 A | 7/2000 | Hirano |
| 6,090,427 A | 7/2000 | Mazurek et al. |
| 6,112,437 A | 9/2000 | Lovitt |
| 6,114,667 A | 9/2000 | Balandier et al. |
| 6,161,470 A * | 12/2000 | Justus .................. 99/319 |
| 6,173,506 B1 | 1/2001 | Kruepke et al. |
| 6,182,554 B1 | 2/2001 | Beaulieu et al. |
| 6,189,438 B1 * | 2/2001 | Bielfeldt et al. ............. 99/321 |

| | | |
|---|---|---|
| 6,194,020 B1 | 2/2001 | Myers et al. |
| 6,196,422 B1 | 3/2001 | Tuyls et al. |
| 6,199,318 B1 | 3/2001 | Stewart et al. |
| 6,202,542 B1 * | 3/2001 | Melton .................. 99/322 |
| 6,202,543 B1 | 3/2001 | Moya et al. |
| 6,221,245 B1 | 4/2001 | Colburn |
| 6,223,948 B1 | 5/2001 | Davis |
| 6,226,909 B1 | 5/2001 | Banning |
| 6,235,039 B1 | 5/2001 | Parkin et al. |
| 6,242,121 B1 | 6/2001 | Pedicini et al. |
| 6,250,208 B1 | 6/2001 | Helps et al. |
| 6,271,001 B1 | 8/2001 | Clarke et al. |
| 6,272,973 B1 | 8/2001 | Fukushima et al. |
| 6,276,262 B1 * | 8/2001 | Chen ..................... 99/322 |
| 6,279,461 B1 | 8/2001 | Fukushima et al. |
| 6,291,144 B1 | 9/2001 | Aylward et al. |
| 6,311,214 B1 | 10/2001 | Rhoads |
| 6,328,181 B1 | 12/2001 | Schroeder et al. |
| 6,333,180 B1 | 12/2001 | Farbood et al. |
| 6,335,548 B1 | 1/2002 | Roberts et al. |
| 6,340,036 B1 | 1/2002 | Toyoizumi et al. |
| 6,350,594 B1 | 2/2002 | Clarke et al. |
| 6,368,759 B1 | 4/2002 | Bourdelais et al. |
| 6,371,756 B1 | 4/2002 | Toohey |
| 6,372,267 B1 | 4/2002 | Kealey et al. |
| 6,382,087 B1 | 5/2002 | Iiyama |
| 6,395,311 B2 | 5/2002 | Jia |
| 6,399,139 B2 | 6/2002 | Myers et al. |
| 6,428,931 B1 | 8/2002 | Golovin |
| 6,432,113 B1 | 8/2002 | Parkin et al. |
| 6,436,620 B1 | 8/2002 | Aylward et al. |
| 6,443,335 B1 | 9/2002 | Pinedjian et al. |
| 6,443,590 B1 | 9/2002 | Lovitt |
| 6,444,609 B1 | 9/2002 | Golovin |
| 6,458,569 B1 | 10/2002 | Farbood et al. |
| 6,460,451 B1 | 10/2002 | Helman et al. |
| 6,464,459 B2 | 10/2002 | Illingworth |
| 6,470,597 B1 | 10/2002 | Stipp |
| 6,490,883 B2 | 12/2002 | Trembley et al. |
| 6,521,916 B2 | 2/2003 | Roberts et al. |
| 6,542,927 B2 | 4/2003 | Rhoads |
| 6,546,795 B1 | 4/2003 | Dietz |
| 6,561,317 B1 | 5/2003 | Dudley |
| 6,581,915 B2 | 6/2003 | Bartsch et al. |
| 6,582,747 B2 | 6/2003 | Myers et al. |
| 6,616,094 B2 | 9/2003 | Illingworth |
| 6,658,989 B2 * | 12/2003 | Sweeney et al. ............... 99/315 |
| 2001/0007693 A1 | 7/2001 | Myers et al. |
| 2001/0011660 A1 | 8/2001 | Schroeder et al. |
| 2001/0030308 A1 | 10/2001 | Schroeder et al. |
| 2001/0032672 A1 | 10/2001 | Schroeder et al. |
| 2001/0037584 A1 | 11/2001 | Behm |
| 2002/0016816 A1 | 2/2002 | Rhoads |
| 2002/0020301 A1 | 2/2002 | Verhoef |
| 2002/0035928 A1 | 3/2002 | Kataoka |
| 2002/0066798 A1 | 6/2002 | Laudamiel-Pellet et al. |
| 2002/0066967 A1 | 6/2002 | Bartsch et al. |
| 2002/0068009 A1 | 6/2002 | Laudamiel-Pellet et al. |
| 2002/0068010 A1 | 6/2002 | Laudamiel-Pellet et al. |
| 2002/0070156 A1 | 6/2002 | Melgaard et al. |
| 2002/0071868 A1 | 6/2002 | Jia |
| 2002/0071890 A1 | 6/2002 | Budwig et al. |
| 2002/0107187 A1 | 8/2002 | Kingston et al. |
| 2002/0131076 A1 | 9/2002 | Davis |
| 2002/0134249 A1 | 9/2002 | Melton |
| 2002/0136819 A1 | 9/2002 | Myers et al. |
| 2002/0148772 A1 | 10/2002 | Kataoka |
| 2002/0164410 A1 | 11/2002 | Ogden et al. |
| 2002/0169116 A1 | 11/2002 | Kingston et al. |
| 2002/0187925 A1 | 12/2002 | Kingston et al. |
| 2003/0008059 A1 | 1/2003 | Macinnes et al. |
| 2003/0035917 A1 | 2/2003 | Hyman |
| 2003/0040957 A1 | 2/2003 | Rodriguez et al. |
| 2003/0041739 A1 | 3/2003 | Cai |
| 2003/0045676 A1 | 3/2003 | Kingston et al. |
| 2003/0082360 A1 | 5/2003 | O'Donnell et al. |
| 2003/0087103 A1 | 5/2003 | Belmares et al. |
| 2003/0148300 A1 | 8/2003 | Valentin et al. |
| 2003/0148965 A1 | 8/2003 | Hofer et al. |
| 2003/0164557 A1 | 9/2003 | Chung et al. |
| 2003/0168751 A1 | 9/2003 | Bartsch et al. |
| 2003/0173376 A1 | 9/2003 | Bilskie et al. |

\* cited by examiner

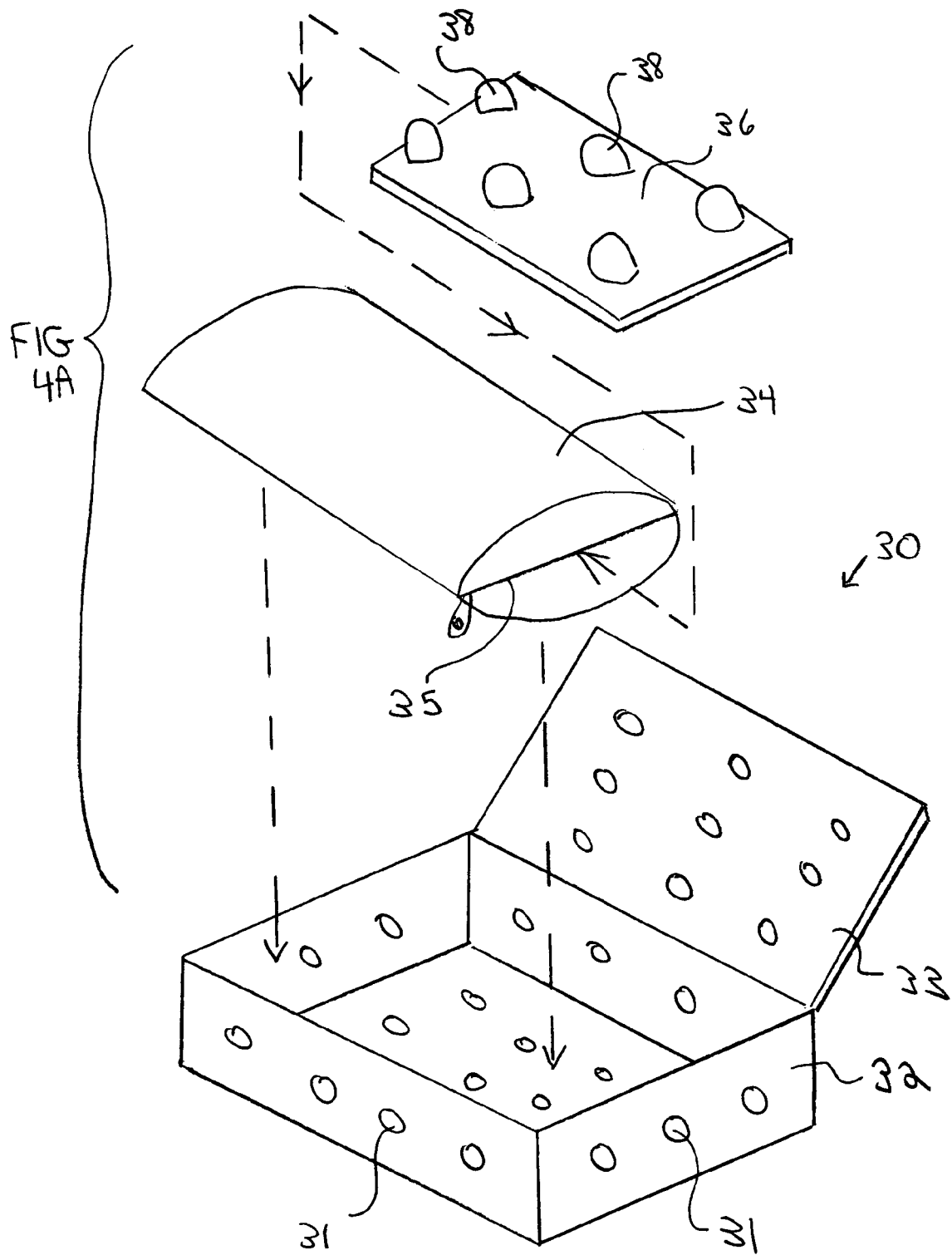

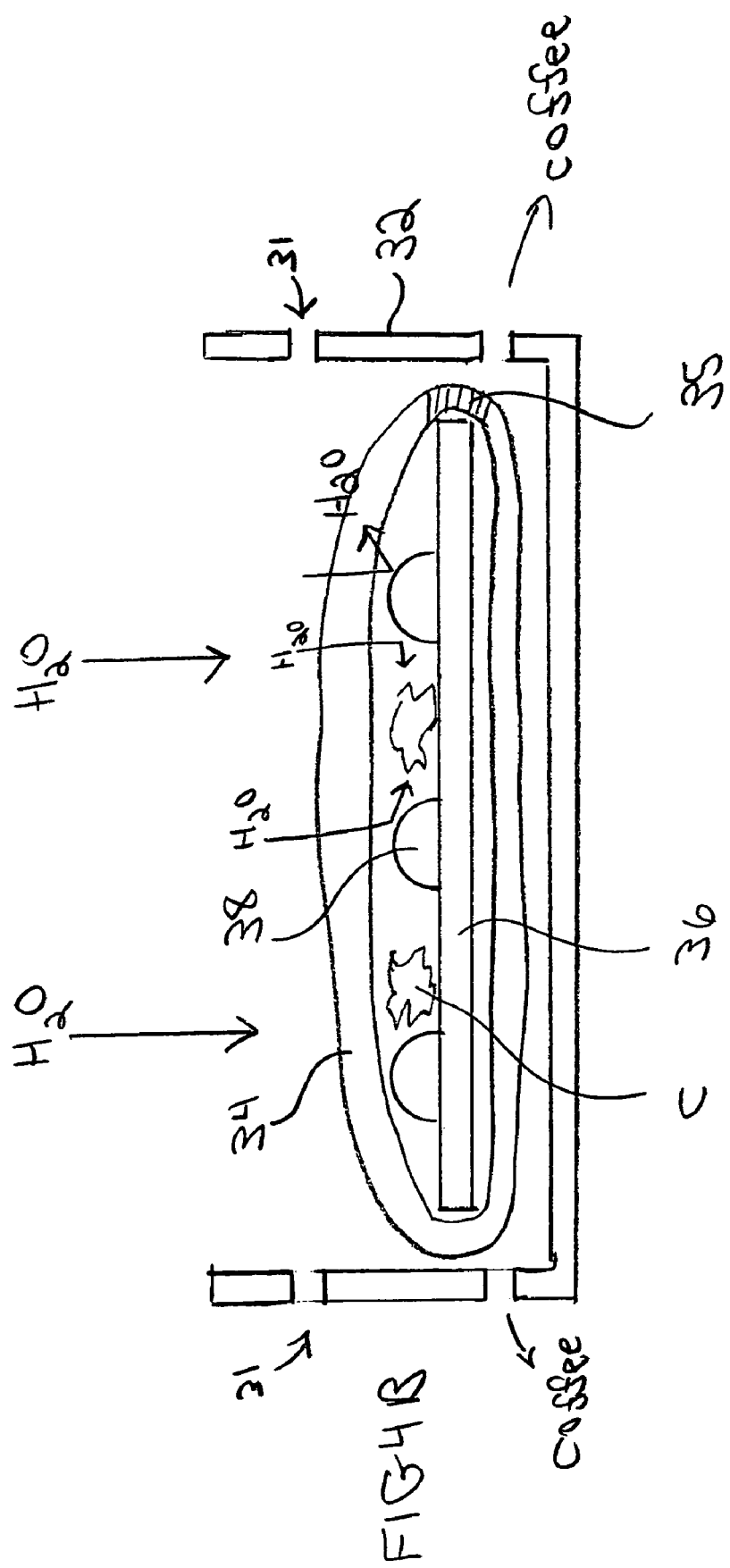

ered into the top of the sleeve.
WIRE CLOTH COFFEE FILTERING SYSTEMS

RELATED APPLICATIONS

This application claims priority under 35 U.S.C. § 119 to U.S. Provisional Application No. 60/441,217, filed Jan. 21, 2003; U.S. Provisional Application No. 60/468,035, filed May 6, 2003; U.S. Provisional Application No. 60/476,106, filed Jun. 6, 2003; U.S. Provisional Application No. 60/493,572, filed Aug. 11, 2003; and U.S. Provisional Application No. 60/533,240, filed Dec. 31, 2003.

TECHNICAL FIELD

The present invention relates to coffee filtering systems.

BACKGROUND OF THE INVENTION

Current drip coffee filtering systems operate by putting dry coffee grains in a filter, and then pouring heated water the coffee grains. Typically, drip coffee filters are made of paper. The pores in the paper filter permit the brewed coffee to pass therethrough while still preventing the passage of undesirably large coffee grains. Unfortunately, paper filters suffer from many disadvantages. For example, they must be replaced after every use. Secondly, paper filters tend not to hold their shape. Therefore, coffee grains are often inadvertently spilled when the paper filters are removed. Thirdly, the paper filter's soft corner edges may inadvertently fold inwardly when placed into a coffee brewing machine such that the heated water bypasses the coffee grains partially or entirely. In addition, some of the coffee grains pour into the cup.

An additional disadvantage common to both paper filters is that they have grain leakage problems. Specifically, finer grains of coffee tend to seep through the filter and are deposited in the drinker's coffee cup. Additionally, existing paper filtering systems tend to require considerable time for coffee brewing. As a result, a trade-off exists between the time taken to brew the coffee and the amount of unwanted coffee grains that seep through the filter into the coffee cup.

What is instead required is a system in which coffee can be brewed and filtered more quickly, so as to save time in coffee preparation. Additionally, an improved filtering system should not require constant filter replacement after every use. In addition, an improved filtering system would preferably prevent small coffee grains from passing therethrough, and being deposited in the user's coffee cup.

SUMMARY OF THE INVENTION

The present invention provides a beverage filter assembly having a frame with at least one (but preferably a plurality) of openings passing therethrough; and a wire cloth filter disposed within the frame.

The present invention's use of wire cloth as the filtering mechanism has many advantages. First, as compared to paper, it need not be replaced after every usage. Second, the present wire cloth filter has a pore size small enough to filter small coffee grains while still permitting flow therethrough. Advantageously, this filtering is accomplished at a rate which is faster than that of a paper filter. Third, by filtering more thoroughly and at a faster rate than paper, the filter of the present invention can be made smaller than that of a comparable paper filter. Thus, a smaller amount of coffee grains is required to brew the same amount of coffee. Fourth, the use of an optional adjustable flow restrictor can be used to selectively prolong steep times and thus also require the use of less coffee. Consequently, savings in terms of both filter costs, and coffee costs are realized.

In its various preferred embodiments, the present wire cloth filter assembly may include a diffuser disposed therein. The diffuser may simply sits in the wire cloth filter, and be removable from the wire cloth filter. Alternatively, the diffuser may be formed integral to the bottom (and/or top) of the frame. In various embodiments, the diffuser may be conical, rounded, or spherical.

The present wire cloth filter may have a density of at least 325 strands per square inch, or more preferably, at least 375 strands per square inch. Most preferably, the present wire cloth filter may have a density of at least 400 strands per square inch. The present wire cloth filter may be made of stainless steel, and may optionally be gold plated.

In various embodiments, the assembly may also include a floating member attached to the frame, and/or a lid attached to a top of the frame, and/or a flow regulator on the bottom of the frame.

Optionally, the wire cloth filter may be shaped as a flattened bag, with a plurality of rounded diffusers disposed therein. Such a flattened bag wire cloth may be disposed within a box-shaped frame.

Optionally, the frame may be a sleeve with the wire cloth filter suspended therein. In various embodiments, a rounded diffuser may sit within the wire cloth filter, and the frame may also include a top having a diffuser therein.

Optionally, the frame may be spherical, and comprise an outer frame, an inner frame with the wire cloth filter disposed therebetween.

In optional embodiments, the present wire cloth filter may be suspended by a frame held within a drinking cup, or within a coffee pot.

In further embodiments, the present invention provides a drinking straw assembly, including a drinking straw; a wire cloth filter disposed at an end of the drinking straw; and a frame having one or more openings passing therethrough disposed around the wire cloth filter.

In further embodiments, the present invention provides a beverage lid including, a lid; an air inlet passing through the lid; a fluid outlet passing through the lid; and a wire cloth filter covering the fluid outlet.

BRIEF DESCRIPTION OF THE DRAWINGS

FIG. 4A is an exploded perspective view of a box-type frame with a flattened bag wire cloth having a plurality of rounded diffuser therein.

FIG. 4B is a sectional side elevation view through the device of FIG. 4A.

DETAILED DESCRIPTION OF THE DRAWINGS

The present invention uses "wire cloth" for beverage filtering. In preferred uses, the present invention can be used for filtering coffee. It is to be understood, however, that the present invention is not so limited. For example, it may be used for filtering coffee or tea, or any other beverage.

As understood herein, "wire cloth" is understood to mean a weaved material having a density of at least 325 strands per square inch. In contrast, a "wire mesh" is understood to mean a weaved material having a density of less than 325 strands per square inch. Alternatively, as understood herein, "wire cloth" is understood to mean a weaved material having a micron reading of 30 or below.

In accordance with the present invention, the wire cloth may comprise a woven or perforated metal. Alternatively, the wire cloth may comprise cotton canvas, or heat-resistant plastic threaded in cloth form.

The present invention has many different embodiments. Various examples of these different embodiments of the invention are described herein. It is to be understood that the present invention is not, however, limited to any of the various exemplary embodiments described herein. Rather, other systems and designs are also contemplated, all keeping within the scope of the claimed invention.

Figure 1:
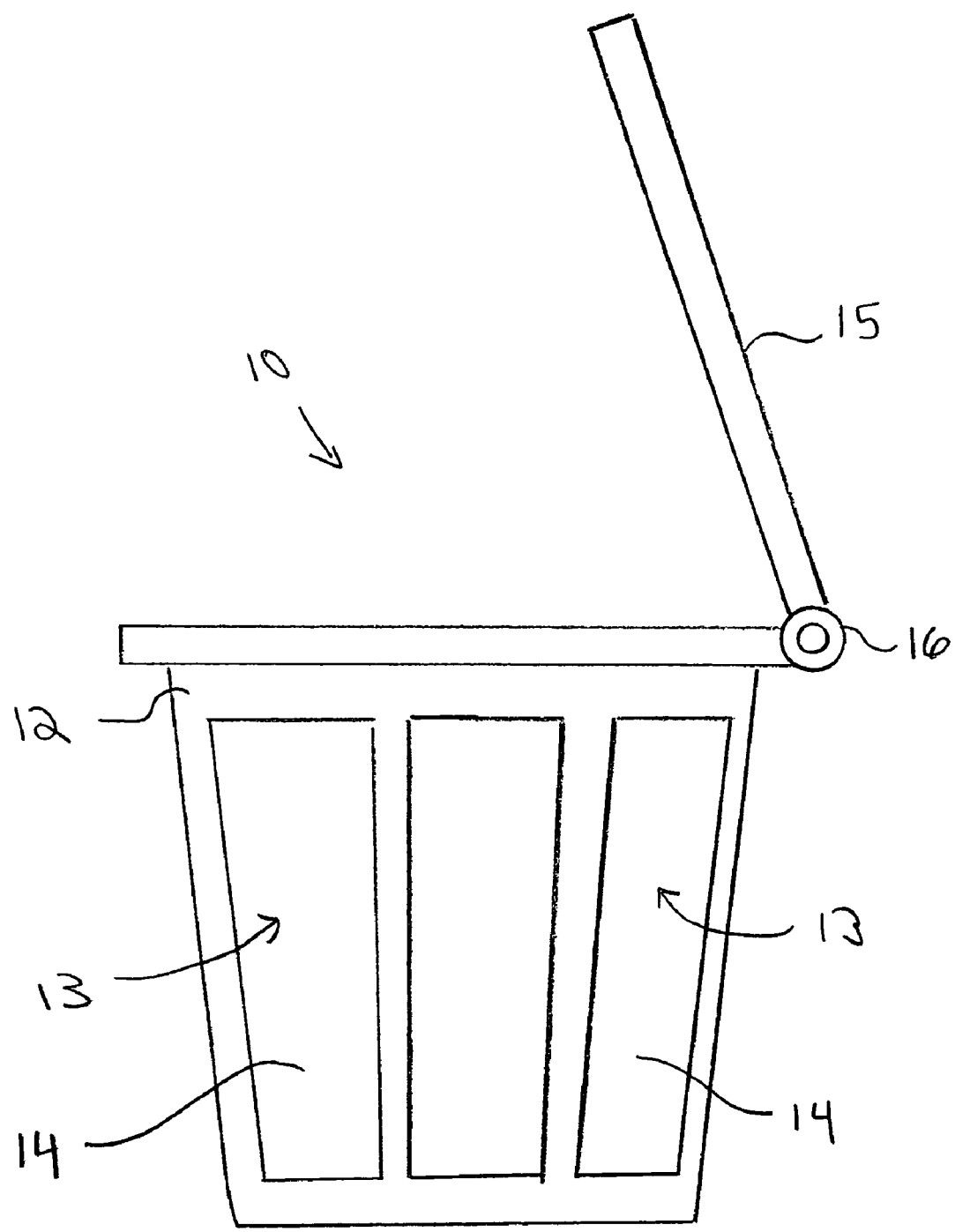
FIG. 1 is a side elevation view of a basket-type frame with a wire cloth filter therein.

Referring first to FIG. 1, a beverage filter assembly 10 is provided. Assembly 10 includes a frame 12 having a plurality of openings 13 passing therethrough. A wire cloth filter 14 is positioned within frame 12. An optional lid 15 may be connected to frame 12 by a hinge 16.

Wire cloth 14 may optionally be made of stainless steel. In various embodiments, wire cloth filter 14 may be gold plated. In preferred embodiments, wire cloth filter 14 has a density of at least 325 strands per square inch. More preferably, wire cloth filter 14 has a density of at least 375 strands per square inch.

In use, coffee grains are placed within wire cloth filter 14, and heated water is then poured thereover. The brewed coffee then seeps through wire cloth filter 14, passing out through openings 13 in frame 12. Assembly 10 can be positioned within a fluid container (into which the brewed coffee flows), or it may be positioned above a fluid container (into which the brewed coffee drips).

Figure 2:
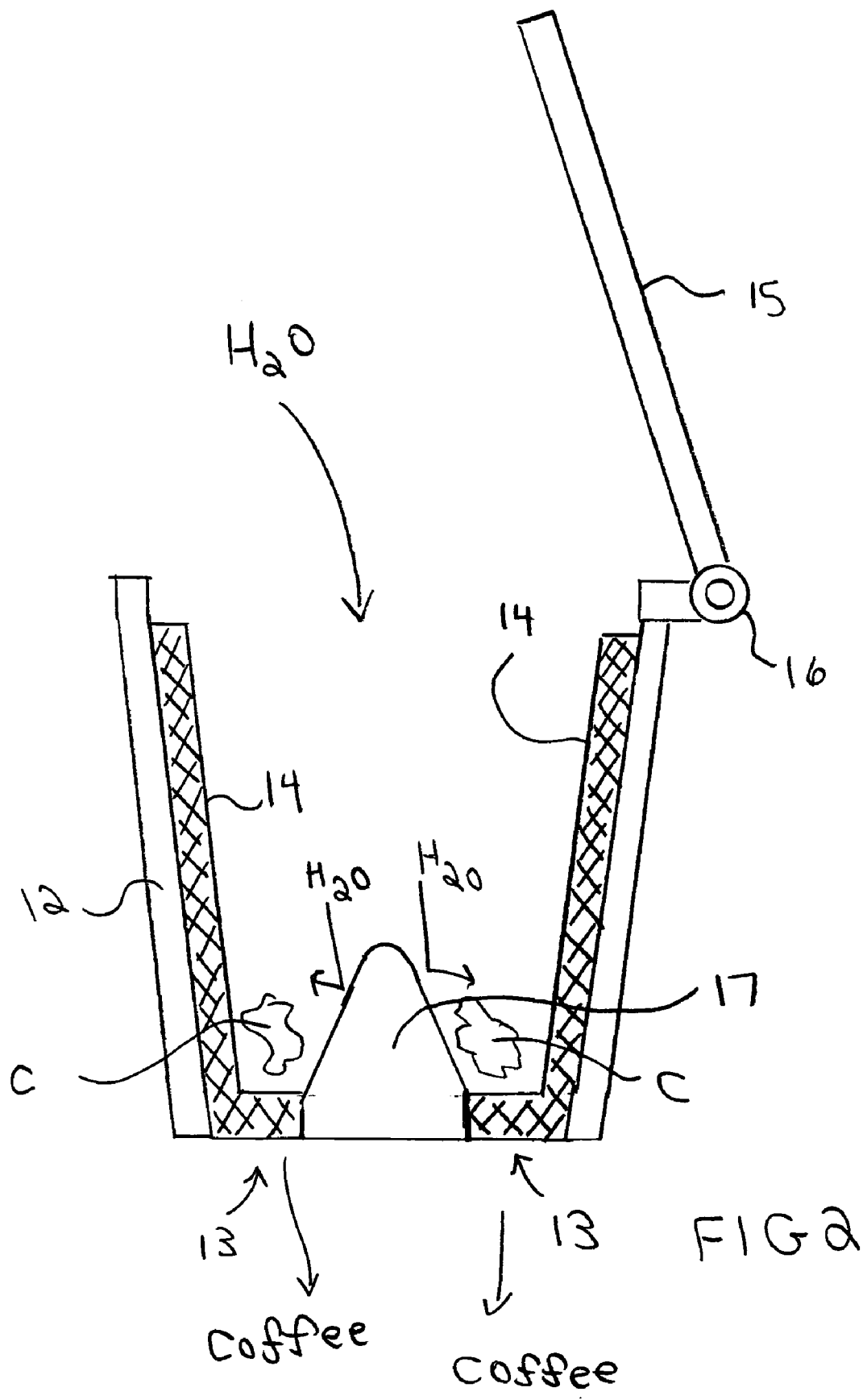
FIG. 2 is a sectional side elevation view of the device of FIG. 1, showing an optional diffuser therein.

FIG. 2 shows an embodiment of the invention in which openings 13 are disposed on the bottom of frame 12. (It is to be understood that openings 13 may be disposed on the sides or bottom of frame 12, or both.) Coffee grains C are placed into the basket formed by frame 12 and wire cloth 14, as shown. When heated water is added from above, it will strike diffuser 17, splashing about at the bottom of the basket. Such splashing will cause the heated water ($H_2O$) to mix rapidly with the coffee grains C. Such rapid mixing results in a faster preparation time for the brewed coffee, and reduces the amount of coffee needed in the filter. In contrast, existing filtering systems simply run a narrow stream of heated water through a pile of coffee grains sitting in a filter. This tends to result in dry (i.e. wasted) coffee grains around the edges of the coffee grain pile after the coffee has been brewed.

In preferred embodiments, diffuser 17 may be conical-shaped as shown. It may also be curved or rounded. (As will be shown in further embodiments, the diffuser may be spherical). Diffuser 17 may be integral to frame 12, as shown. (As will be shown in further embodiments, however, a diffuser may simply sit within or on top of the wire cloth filter, and be removable from the wire cloth filter.)

Figure 3:
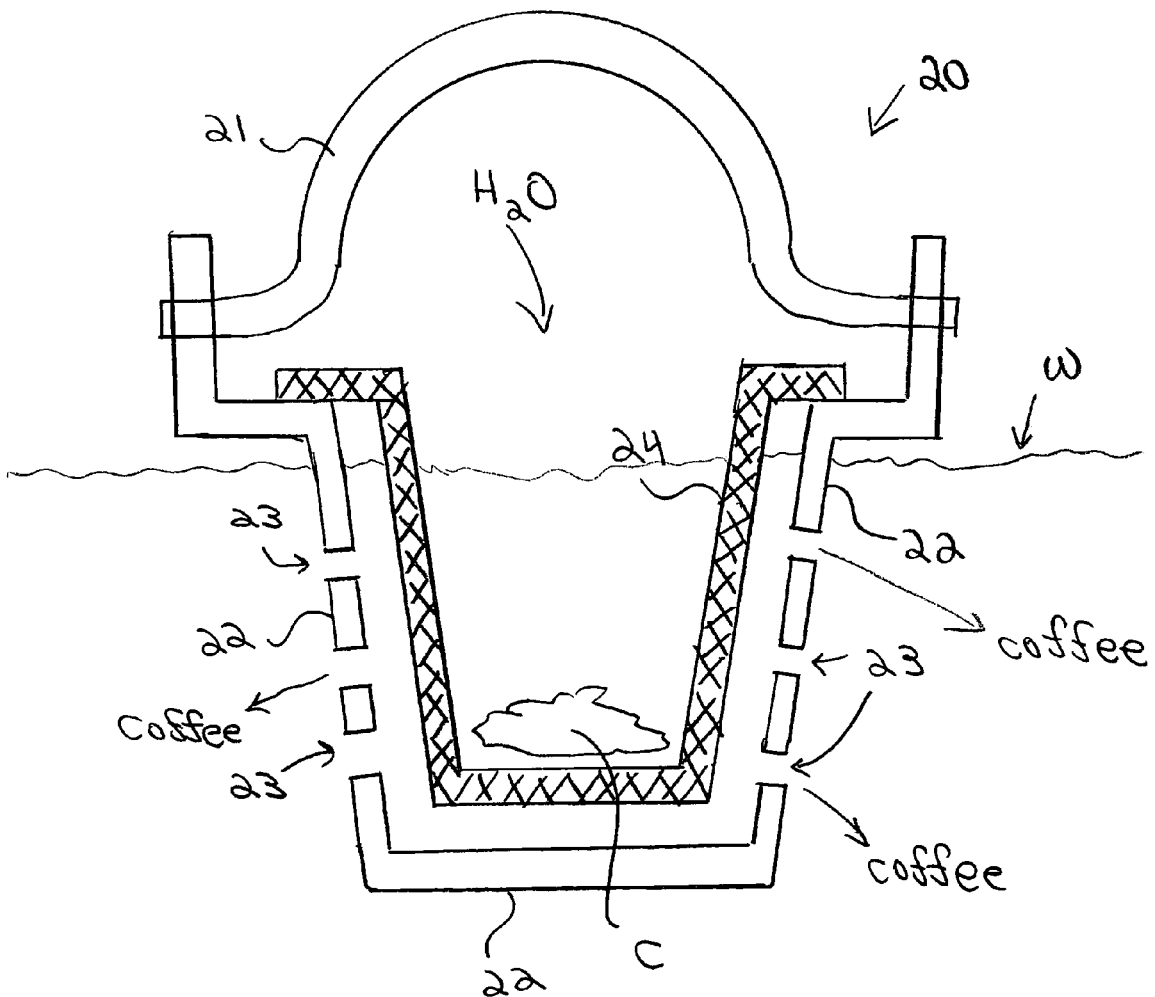
FIG. 3 is a sectional side elevation view of an alternate embodiment of a basket-type frame with a wire cloth filter therein, with the filter being spaced apart from the frame.

FIG. 3 shows another optional embodiment of the invention. Assembly 20 includes a frame 22 having a plurality of openings 23. A wire cloth filter 24 is suspended within frame 22. Coffee grains C are placed in wire cloth filter 24. Heated water is then poured into the top of assembly 20 and over coffee grains C. Brewed coffee passes out through wire cloth filter 24 and out through openings 23 in frame 22. In use, assembly 20 may be partially submerged in a fluid container. IE: submerged up to water line W. (Alternatively, however, assembly 20 may instead be positioned within a flow path above a fluid container).

As shown, wire cloth filter 24 may be positioned such that only its top end contacts frame 22, as shown. This results in a space or gap between wire cloth filter 24 and frame 22, as shown. Designing a preferred dimension for this space gap may be particularly advantageous in adjusting the amount of time required for proper brewing. Specifically, by varying the dimensions of openings 23, the speed at which fluid passes therethrough can be adjusted, thereby adjusting the beverage preparation time. Frame 22 has a convenient handle 21 such that it can be lifted and removed from the fluid container or flow path.

FIGS. 4A and 4B show yet another embodiment of the present invention. Assembly 30 includes a box-type frame 32 (which may have an optional lid 33). Frame 32 has a plurality of openings 31, as shown. A wire cloth 34 is formed in the shape of a flattened bag. Wire cloth bag 34 may have one end that is shut by a zipper 35. A flat plate 36 having a plurality of diffusers 38 thereon is also provided. Flat plate 36 is inserted into wire cloth bag 34. As shown in FIG. 4B, coffee grains C are also placed into wire cloth bag 34. When water is poured down onto wire cloth bag 34, it will also hit diffusers 38. The presence of diffusers 38 will cause the water to splash back and forth therebetween. This splashing will enhance mixing of the water and the coffee grains C within wire cloth bag 34. The brewed coffee will then seep out of holes 31 in frame 32.

Figure 5:
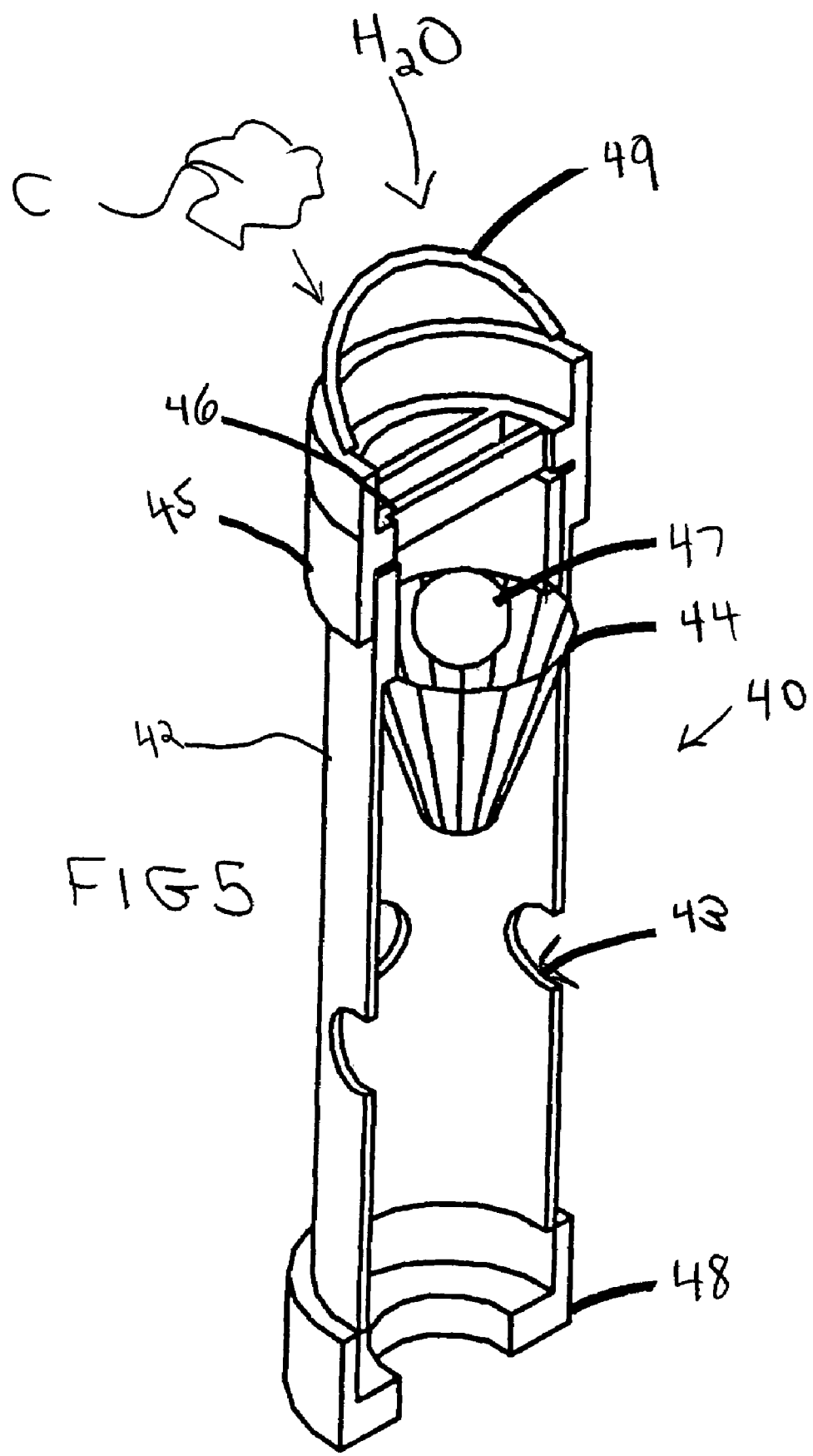
FIG. 5 is a sectional perspective view of a sleeve-type frame having a wire cloth filter disposed therein with a ball diffuser sitting in the wire cloth filter and a second diffuser formed into the top of the sleeve.

FIG. 5 shows yet another embodiment of the present invention. Assembly 40 includes a frame in the shape of a sleeve 42 having a plurality of openings 43 passing therethrough. A conical-shaped wire cloth filter 44 is disposed in sleeve 42. A ball-shaped diffuser 47 is positioned to sit on top of wire cloth filter 44. Sleeve 42 has a top 45 having a grill-type diffuser 46 therein. A bottom 48 is also provided.

In use, coffee grains C and heated water are both added through top 45. The coffee grains C are typically first inserted through top diffuser 46 of top 45. The coffee grains sit within wire cloth filter 44 (around spherical diffuser 47). Then, heated water is poured through top diffuser 46 of top 45. The brewed coffee then seeps through wire cloth filter 44, and exits sleeve 42 through openings 43. In use, assembly 40 may be partially submerged in a fluid container, or be positioned within a flow path above a fluid container. An advantage of the system of FIG. 5 is that, after filtering is complete, a user simply turns the system upside down (pouring the coffee grains back out through the diffuser openings 46 in top 45). Diffuser openings 46 are dimensioned such that diffuser 47 remains within sleeve 42 when assembly 40 is upside down. Thus, ball-shaped diffuser 47 need not be attached to any part of assembly 40. An advantage of diffuser 47 is that when water is added from above, it will strike diffuser 47, splashing about causing rapid mixing, resulting in faster preparation times, and reducing the amount of coffee needed in the filter. For convenience, a carrying handle 49 is also provided.

Figure 6:
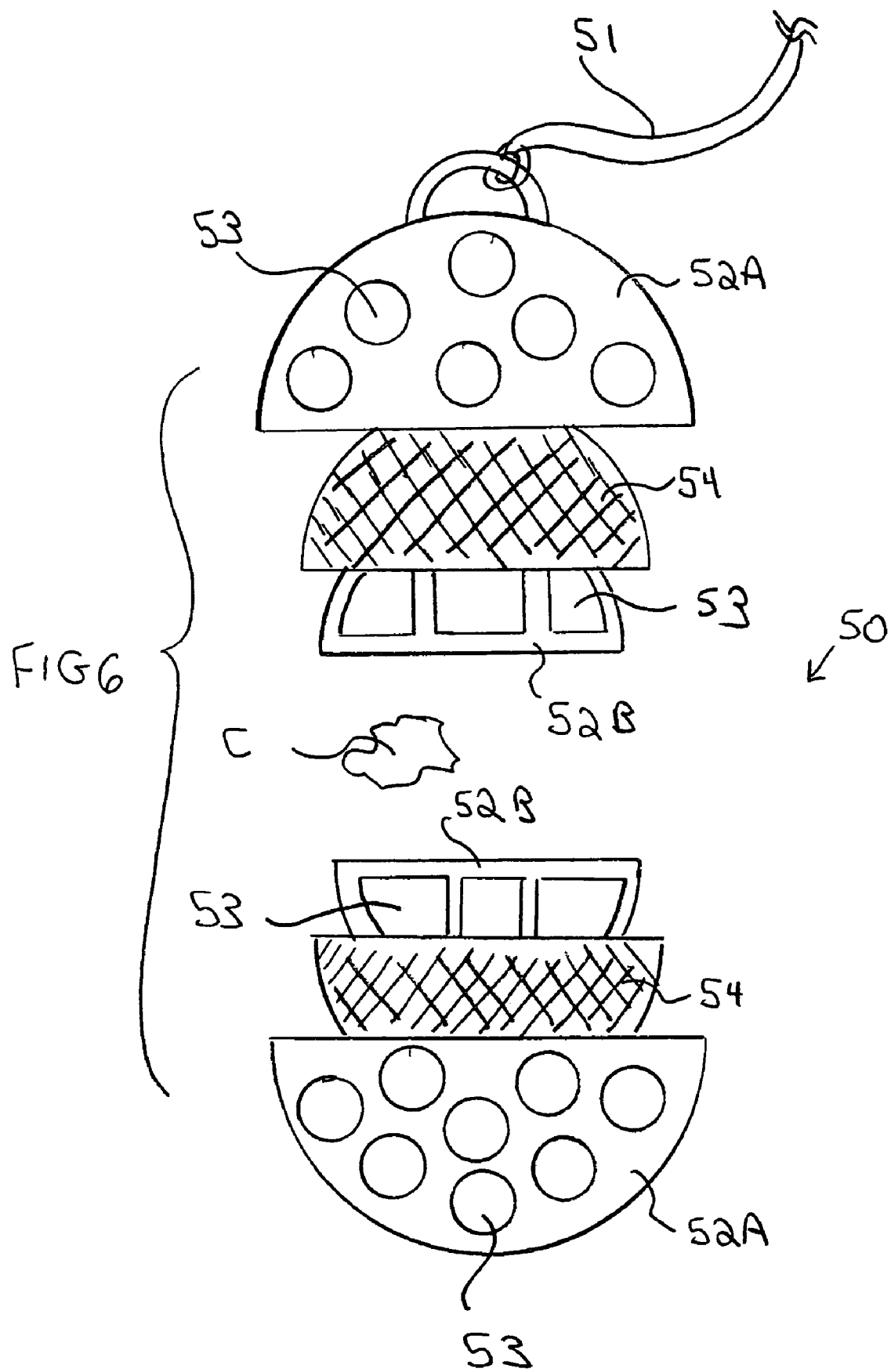
FIG. 6 is an exploded perspective view of a ball-shaped frame with a wire cloth filter disposed therein.

FIG. 6 shows an embodiment of the invention involving a two part frame. Specifically, frame 52 includes an outer portion 52A and an inner portion 52B. Disposed therebetween is a wire cloth filter 54. Assembly 50 may be snap-fit together, screw-fit together or hinged together. Coffee grains C are placed into the center of assembly 50, and assembly 50 is closed therearound. Assembly 50 is then submerged in a fluid container. A convenient retrieval cord 51 is provided for removing assembly 50 from the fluid container after use. Each of frame portions 52A and 52B have openings 53 passing therethrough. As water passes through openings 53, brewed coffee will seep out of assembly 50 and into the fluid container.

Figure 7:
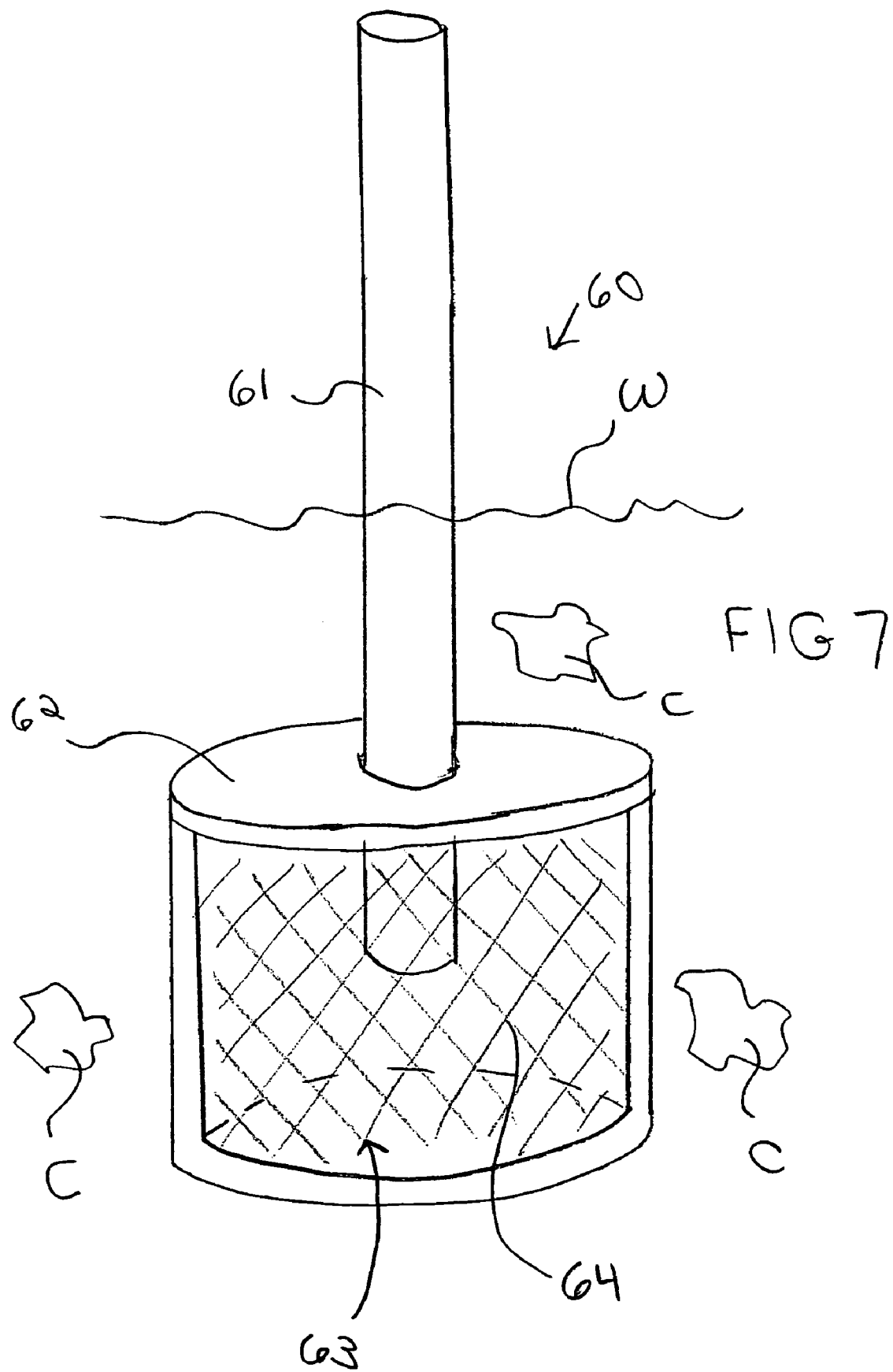
FIG. 7 is a drinking-straw embodiment of the present invention.

FIG. 7 shows an embodiment of the invention incorporated into a drinking straw. Assembly 60 includes a drinking straw 61, an end of which is submerged below a water level W. Coffee grains C are placed within the fluid container holding the water. A frame 62 is provided at the bottom end of the drinking straw 61. Frame 62 has at least one opening 63. A wire cloth membrane 64 covers opening 63. In use, the drinker sips on the straw, sucking brewed coffee through wire cloth filter 64. An advantage of this design is that the coffee is actually brewed and filtered within the coffee drinker's cup itself.

Figure 8:
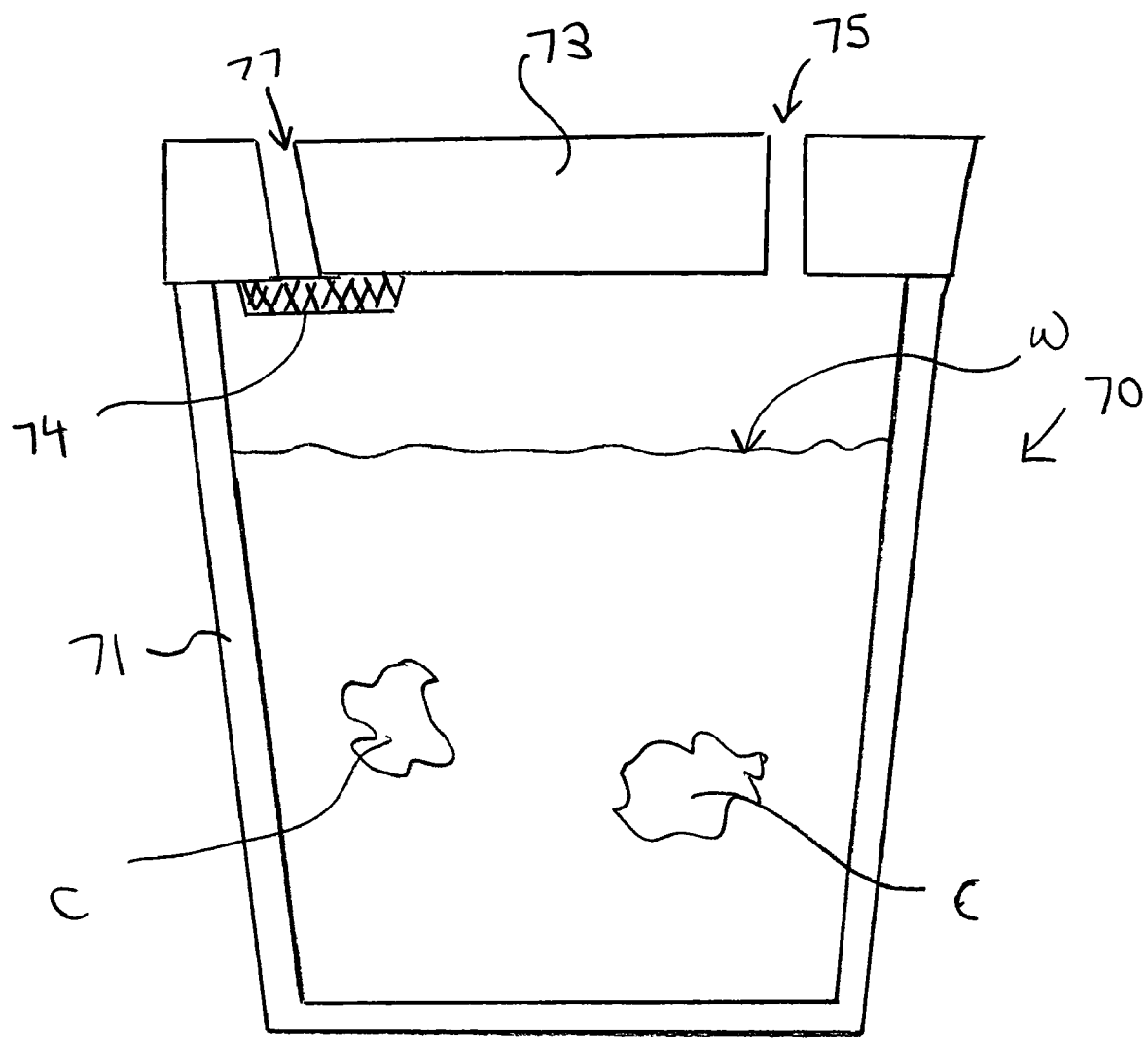
FIG. 8 is a sectional side elevation view of a beverage container with a lid incorporating the wire cloth filter of the present invention.

FIG. 8 shows an embodiment of the invention incorporated into the lid of a drinking cup. Specifically, assembly 70 includes a coffee cup 71 having a lid 73. Lid 73 has an air inlet 75 passing therethrough, and a fluid outlet 77 passing therethrough. A wire cloth filter 74 covers a fluid outlet 77, as shown. In use, coffee grains C and heated water W are placed directly into cup 71. As the user drinks from cup 71 (i.e. sipping through fluid outlet 77) wire cloth filter 74 filters the coffee. Again, an advantage of this design is that the coffee is actually brewed and filtered within the coffee drinker's cup itself.

Figure 9:
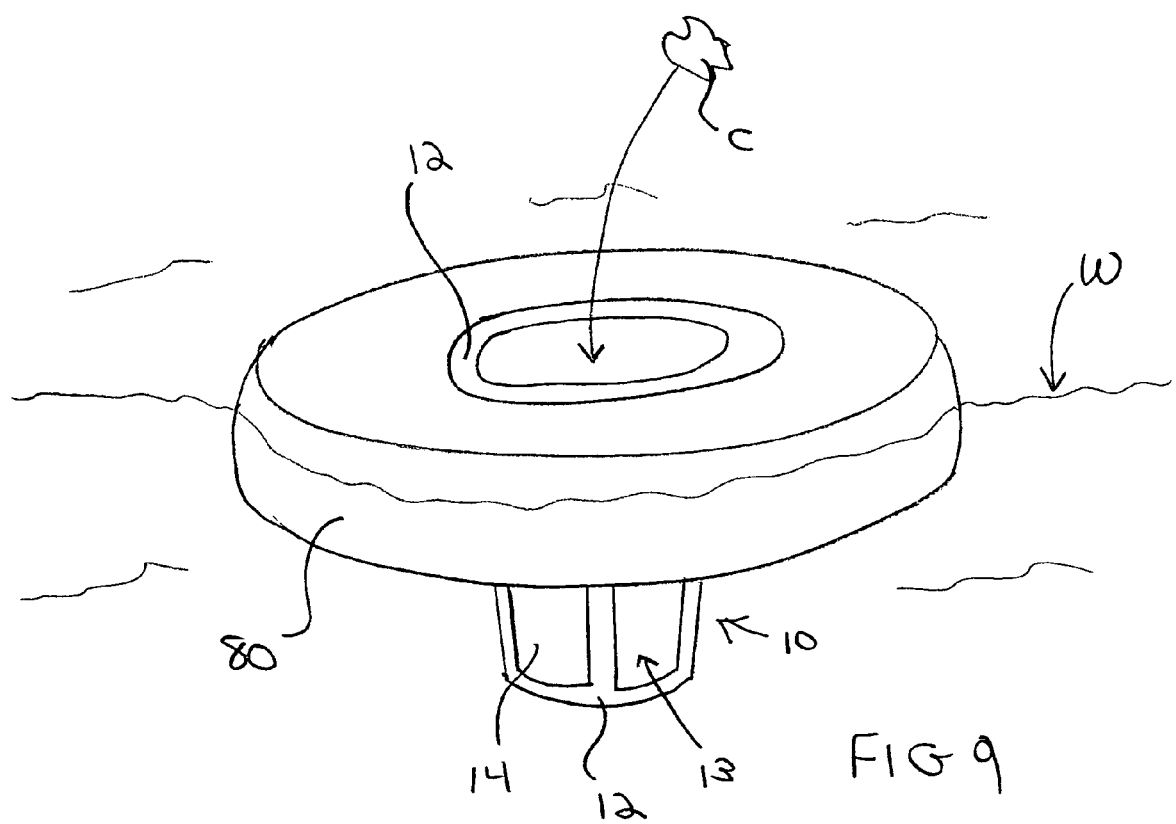
FIG. 9 is a perspective view of a simplified embodiment of the present invention suspended by a flotation ring.

FIG. 9 shows an embodiment of the invention incorporating a floating member attached to the frame. Specifically, assembly 10 (FIGS. 1 and 2) is suspended in a ring 80 of floating material. The system of FIG. 9 is simply placed into a fluid container with ring 80 preventing assembly 10 from sinking. Coffee grains C are placed into the top of assembly 10 (as was described above). Brewed coffee will seep out through wire cloth filter 14, passing through openings 13 in frame 12, as explained above. It is to be understood that the present floating member need not be ring-shaped. In addition, it is to be understood that the present floating member may be used to support any filtering assembly, and is not limited to only supporting assembly 10.

Figure 10:
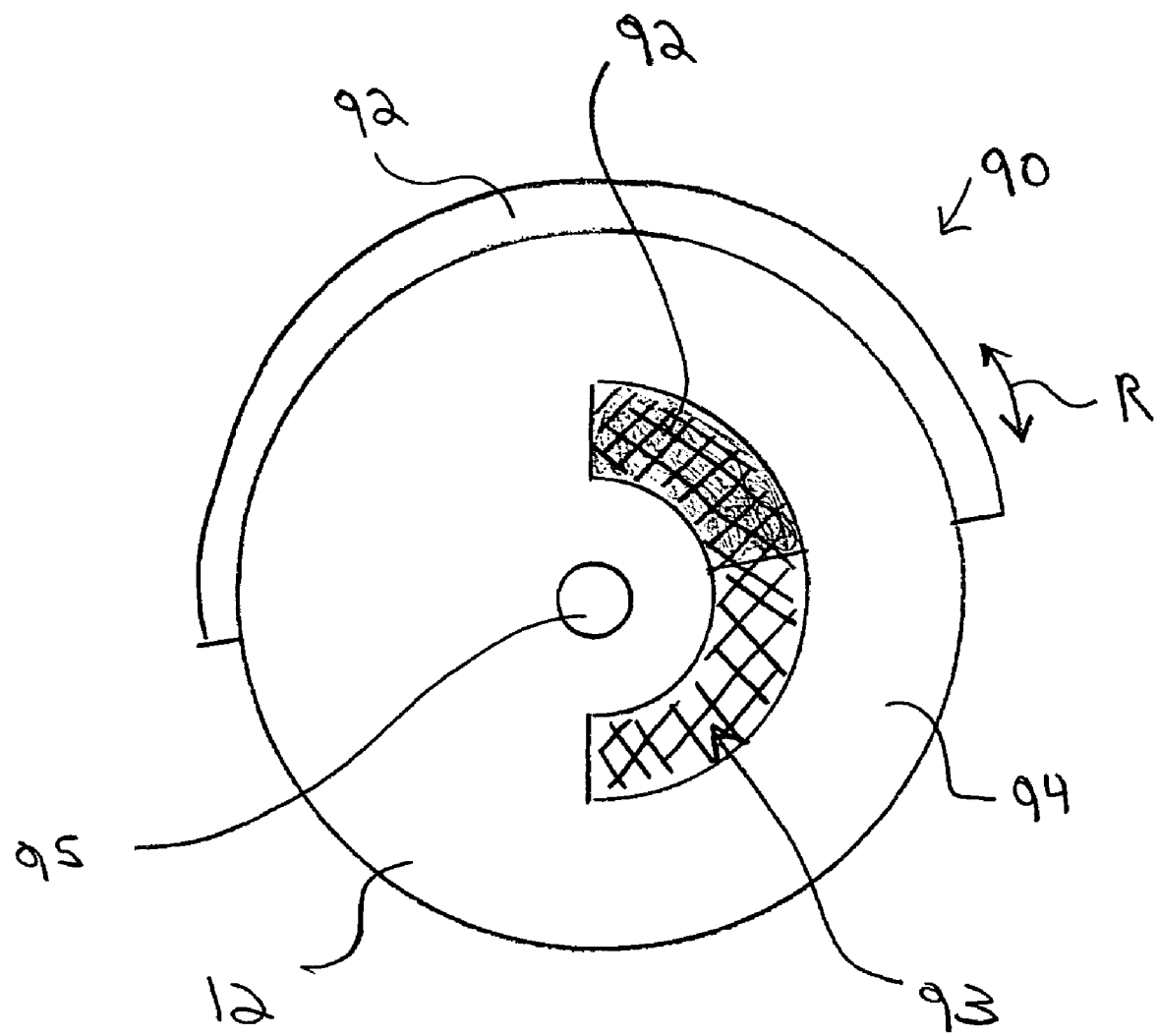
FIG. 10 is a bottom view of an embodiment of the invention incorporating an optional flow restrictor.

FIG. 10 illustrates a flow regulator 90 on the bottom of a frame (such as frame 12 as illustrated in FIG. 2). The flow regulator operates to selectively adjust the amount of flow through the bottom of the frame. It is to be understood that numerous embodiments for such a flow regulator are possible, all keeping within the scope of the present invention. Flow regulator 90 includes a first portion 92 and a second portion 94 which rotate with respect to one another around a hub 95. Second portion 94 may simply comprise frame 12 having an opening 93 passing therethrough. First portion 92 may be hemispherical-shaped, and rotate such that when rotated in direction R, opening 93 will be progressively opened or closed. By adjusting the size of opening 93, the amount of flow passing therethrough can be adjusted. Optionally, opening 93 may be covered with a wire cloth filter, if desired.

Figure 11:
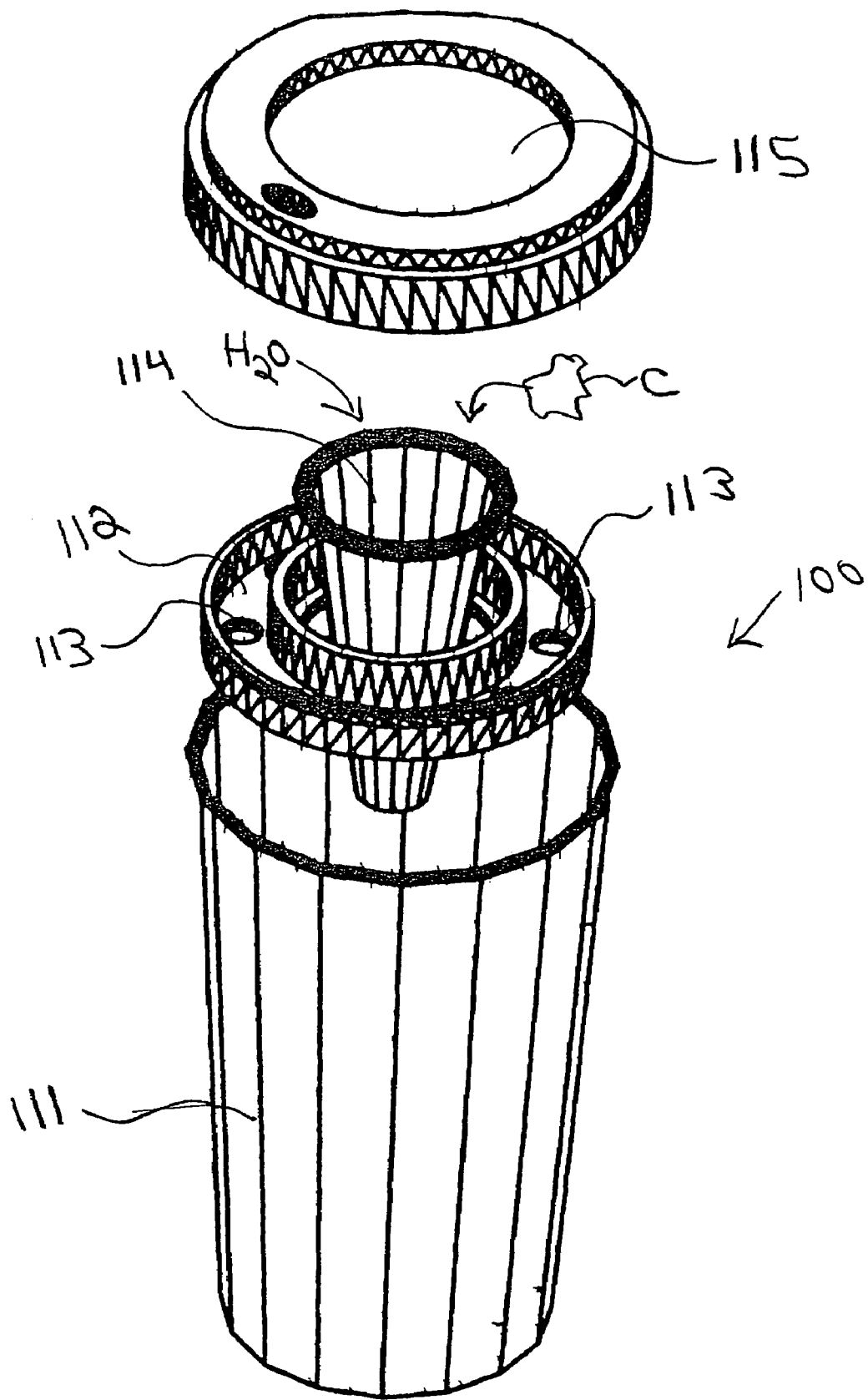
FIG. 11 is an exploded perspective view of an embodiment of the invention suspended in a drinking cup.

FIG. 11 shows an embodiment of the invention in which assembly 100 includes a collar-shaped frame 112 having holes 113 passing therethrough. A wire cloth filter 114 is suspended within frame 112 and placed into a drinking cup 111. A lid 115 is snapped onto cup 111. In use, coffee grains C are placed into wire cloth filter 114. Heated water can be added directly into wire cloth filter 114, or cup 111, or both.

Figure 12:
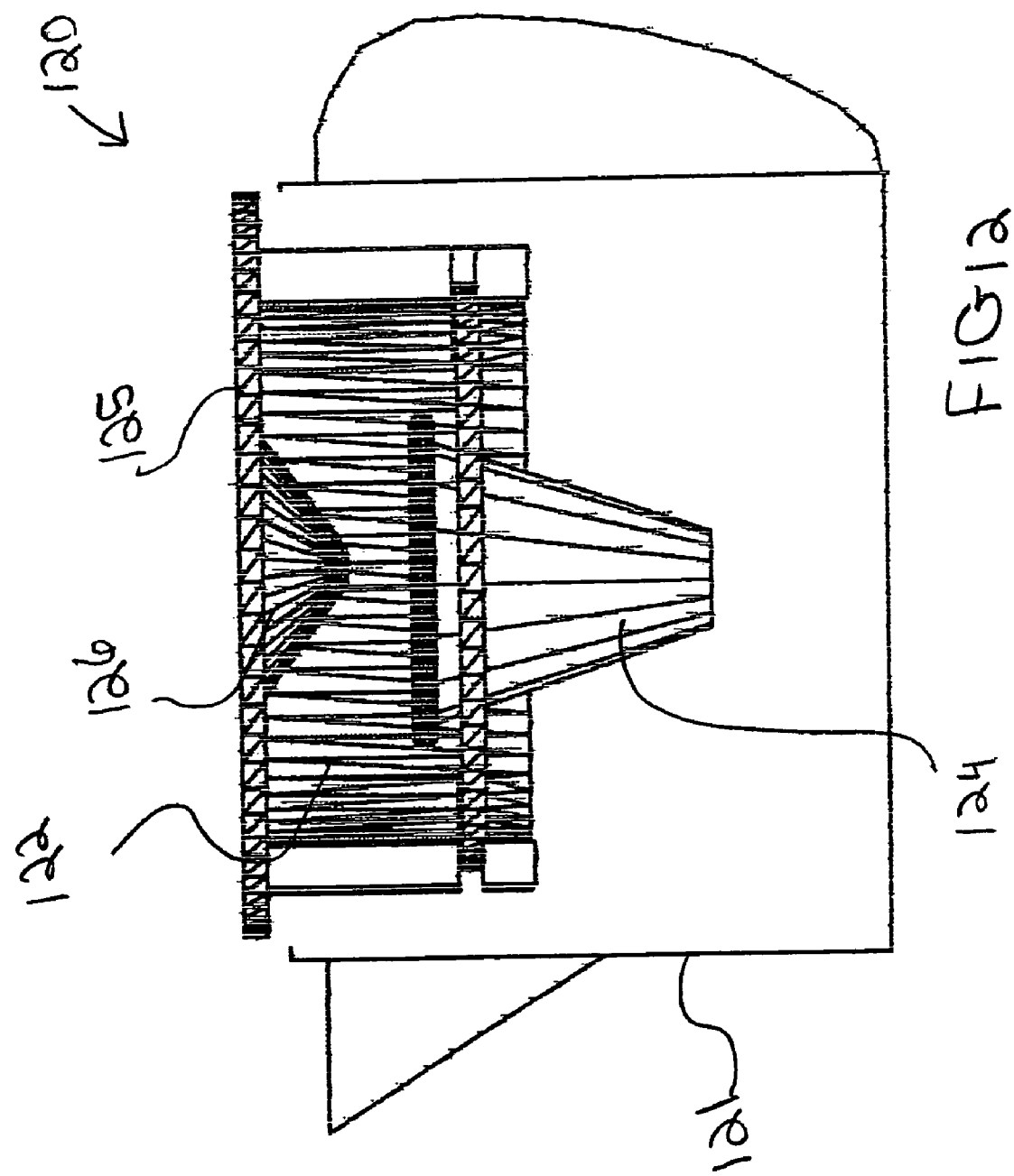
FIG. 12 is an exploded perspective view of an embodiment of the invention suspended in a coffee pot.

Lastly, FIG. 12 shows an embodiment of the invention in which assembly 120 includes a collar-shaped frame 122 in which wire cloth filter 124 is suspended. Frame 122 may have a plurality of holes passing therethrough, or only one hole in which wire cloth filter 124 is suspended. The coffee pot 121 in which frame 122 and wire cloth filter 124 are suspended may preferably include a lid 125 having a center funnel 126 through which heated water is passed during coffee brewing.

What is claimed is:

1. A beverage brewing and drinking cup with filter assembly, comprising:
  a beverage cup assembly;
  a frame at the top of the beverage cup assembly;
  a removable filter positioned within a filter hole in the frame, wherein beverage particles are received into an open top end of the removable filter; and
  a top lid covering the frame and the removable filter, the top lid having a drinking hole passing therethrough, wherein the drinking hole is not positioned over the open top end of the removable filter and wherein the frame comprises at least one frame hole through which fluid level in the beverage cup passes up through when the top lid has been removed to pour water into the removable filter, wherein the at least one frame hole is positioned beside the filter hole, and wherein the frame comprises a vertically extending inner portion around the removable filter, and a vertically extending outer portion dimensioned to be slipped into the beverage cup assembly and rest against an interior side of the beverage cup assembly, such that a fluid pooling channel is formed between the vertically extending inner portion and the vertically extending outer portion, and wherein the at least one frame hole is disposed at the bottom of the pooling channel.

2. The assembly of claim 1, wherein the filter is a wire cloth filter.

3. The assembly of claim 2, wherein the wire cloth filter is made of stainless steel.

4. The assembly of claim 3, wherein the wire cloth filter is gold plated.

5. The assembly of claim 2, wherein the wire cloth filter has a density of at least 325 strands per square inch.

6. The assembly of claim 2, wherein the wire cloth filter has a density of at least 375 strands per square inch.

7. The assembly of claim 1, wherein beverage particles are received into a wire cloth filter.

8. The assembly of claim 1, wherein the frame further comprises an inner lip between an edge of the filter hole and the vertically extending inner portion of the frame.

9. An assembly, comprising:

a frame dimensioned to be received into a top of the beverage cup assembly, the frame having a filter hole passing therethrough and at least one frame hole passing therethrough, wherein the at least one frame hole is positioned beside the filter hole, and wherein the frame also comprises a vertically extending inner portion around a removable filter, and a vertically extending outer portion dimensioned to be slipped into the beverage cup assembly and rest against an interior side of the beverage cup assembly, such that a fluid pooling channel is formed between the vertically extending inner portion and the vertically extending outer portion, and wherein the at least one frame hole is disposed at the bottom of the pooling channel.

10. The assembly of claim 9, further comprising:

a beverage cup, wherein the frame and removable filter are received into the beverage cup; and a top lid covering the frame and the removable filter, the top lid having a drinking hole passing therethrough, wherein the drinking hole is not positioned over the open top end of the removable-filter.

11. The assembly of claim 9, wherein the frame further comprises an inner lip between an edge of the filter hole and the vertically extending portion of the frame.

* * * * *